(12) United States Patent
Hwang et al.

(10) Patent No.: US 12,190,560 B2
(45) Date of Patent: Jan. 7, 2025

(54) AUTOMATIC LABELING METHOD FOR UNLABELED DATA OF POINT CLOUDS

(71) Applicants: Hyundai Motor Company, Seoul (KR); Kia Corporation, Seoul (KR); Industry-Academic Cooperation Foundation, Yonsei University, Seoul (KR)

(72) Inventors: Jin Kyu Hwang, Suwon-si (KR); Ya Gyeol Seo, Seoul (KR); Jae Hyun Park, Seoul (KR); Su Rin Jo, Anyang-si (KR); Min Hyeok Lee, Seoul (KR); Seung Hoon Lee, Uiwang-si (KR); Jun Hyeop Lee, Jeju-si (KR); Sang Youn Lee, Seoul (KR)

(73) Assignees: Hyundai Motor Company, Seoul (KR); Kia Corporation, Seoul (KR); Industry-Academic Cooperation Foundation, Yonsei University, Seoul (KR)

( * ) Notice: Subject to any disclaimer, the term of this patent is extended or adjusted under 35 U.S.C. 154(b) by 330 days.

(21) Appl. No.: 17/901,511

(22) Filed: Sep. 1, 2022

(65) Prior Publication Data
US 2023/0274526 A1      Aug. 31, 2023

(30) Foreign Application Priority Data

Feb. 25, 2022   (KR) ........................ 10-2022-0025396

(51) Int. Cl.
*G06V 10/762*    (2022.01)
*G06V 10/778*    (2022.01)

(52) U.S. Cl.
CPC ........ *G06V 10/762* (2022.01); *G06V 10/7784* (2022.01)

(58) Field of Classification Search
CPC ............. G06V 10/762; G06V 10/7784; G06V 10/764; G06V 10/774; G06V 10/7753;
(Continued)

(56) References Cited

U.S. PATENT DOCUMENTS 11,170,567 B2    11/2021  Omari et al.
2018/0285699 A1*  10/2018  Kolouri ................ G06V 10/758
(Continued)

FOREIGN PATENT DOCUMENTS

KR     20200103170 A     9/2020
KR     102273867 B1      7/2021

*Primary Examiner* — Nimesh Patel
(74) *Attorney, Agent, or Firm* — Slater Matsil, LLP (57) ABSTRACT

An automatic labeling method for assigning labels to unlabeled point clouds among a set of labeled and unlabeled point clouds includes preparing an initial machine learning classification model, selecting a labeled point cloud for each of the unlabeled point clouds based on similarities between a feature vector of each of the unlabeled point clouds output through the model and feature vectors of the labeled point clouds output through the model and assigning a cluster label to each of the unlabeled point clouds based on a label of the selected labeled point cloud, assigning pseudo labels to the unlabeled point clouds to which the cluster labels are assigned based on a confidence score obtained through the model, and updating the model by training the model with the labeled point clouds and the unlabeled point clouds to which the pseudo labels are assigned.

20 Claims, 6 Drawing Sheets

(58) Field of Classification Search
CPC ........ G06V 20/64; G06V 10/82; G06V 20/58; G06V 20/56; G06V 20/588; G06V 20/10; G06V 20/176; G06V 20/41; G06V 2201/12; G06V 10/454; G06V 20/647; G06V 10/7715; G06V 10/80; G06V 20/52; G06V 20/70; G06V 10/806; G06V 20/584; G06V 20/17; G06V 20/20; G06V 10/44; G06V 10/811; G06V 20/653; G06V 10/16; G06V 10/757; G06V 20/46; G06V 40/20; G06V 10/225; G06V 10/778; G06V 20/182; G06V 20/44; G06V 2201/06; G06V 30/1448; G06V 30/18; G06V 30/19173; G06V 30/19013; G06V 30/414; G06F 18/214; G06F 18/2155; G06F 18/23; G06F 18/24; G06F 18/253; G06F 18/217; G06F 18/2431; G06F 18/241; G06F 16/55; G06F 18/22; G06F 18/254; G06F 3/04845; G06F 30/27; G01S 17/89; G01S 17/894; G01S 13/865; G01S 7/417; G01S 13/867; G01S 13/862; G01S 13/726; G01S 17/88; G06N 3/088; G06N 3/09; G06N 20/00; G06N 3/045; G06N 3/08; G06N 3/044; G06N 3/0464; G06N 3/02; G06N 3/04; G06N 5/022; G06N 3/0475; G06N 3/091

See application file for complete search history.

(56) References Cited

U.S. PATENT DOCUMENTS

| | | | |
|---|---|---|---|
| 2019/0101649 A1* | 4/2019 | Jensen | G05D 1/024 |
| 2019/0285752 A1* | 9/2019 | Chattopadhyay | G06V 10/25 |
| 2020/0133269 A1 | 4/2020 | Wang et al. | |
| 2020/0410751 A1* | 12/2020 | Omari | G06V 20/58 |
| 2021/0182912 A1 | 6/2021 | Misra et al. | |
| 2021/0199461 A1* | 7/2021 | Raina | G06F 40/30 |
| 2021/0201143 A1 | 7/2021 | Choi et al. | |
| 2021/0201161 A1 | 7/2021 | Meng et al. | |
| 2021/0241035 A1* | 8/2021 | Sutherland | G06V 10/7784 |
| 2021/0266230 A1 | 8/2021 | Greene, Jr. | |

\* cited by examiner

AUTOMATIC LABELING METHOD FOR UNLABELED DATA OF POINT CLOUDS

CROSS-REFERENCE TO RELATED APPLICATIONS

This application claims the benefit of Korean Patent Application No. 10-2022-0025396, filed on Feb. 25, 2022, which application is hereby incorporated herein by reference.

TECHNICAL FIELD

The present disclosure relates to an automatic labeling method for unlabeled point clouds among a set of point clouds.

BACKGROUND

Light detection and ranging (lidar) data is generally in the form of a point cloud and may be used to detect and classify objects.

The object classification may require a deep learning model that is trained with learning data.

The accuracy in object classification of the deep learning model depends on the amount of learning (or training), and thus sufficient learning data may need to be obtained.

Constructing such sufficient learning data may require a large number of labeled point clouds, and thus a labeling job for a massive quantity of data may be required.

However, manually performing the labeling may have its limitation in terms of quantity and may involve a great amount of time and costs, particularly when tens of thousands of learning data are required.

Sohn, Kihyuk, et al. proposed a learning method in which the deep learning model is trained by use of labeled learning data by class and consistently classifies deformed data in the same class using data augmentation for unlabeled data in the paper entitled "Fixmatch: Simplifying semi-supervised learning with consistency and confidence" at NeurIPS 2020.

However, this method may be ineffective in that, when incorrectly assigned labels are added to learning data, various features of erroneously labeled data may have a more undesirable influence on learning or training.

Cascante-Bonilla, Paola, et al. proposed, in the paper entitled "Curriculum labeling: Revisiting pseudo-labeling for semi-supervised learning" at AAAI 2021, a semi-supervised learning method that may be used even for data in different areas only using a pseudo-labeling method without using data augmentation which is effectively applicable only to a current two-dimensional (2D) image in semi-supervised learning.

This method may enable stable training by selecting data samples with high confidence at the initial stage for the learning data and gradually reducing the threshold value for the selection based on the number of trainings to add difficult data with low confidence to the learning data. In addition, this method may iteratively evaluate and measure confidence of the model using Monte-Carlos dropout when predicting confidence of the model.

However, this method does not use data augmentation and may thus be greatly affected by the quantity and quality of the initial labeled data.

In addition, Chen, Ting, et al. proposed a method that increases the usage of information that may be obtained from unlabeled data by performing semi-supervised learning after performing unsupervised learning to increase the utilization of unlabeled data in the paper entitled "Big self-supervised models are strong semi-supervised learners" at NeurIPS 2020.

This method may use a contrast learning technique for unsupervised learning by decreasing the distance between vectors having similar features and increasing the distance between vectors having different features by obtaining feature vectors of data samples and projecting the feature vectors into a feature representation space. In addition, the method may use knowledge distillation for semi-supervised learning and apply a model that is learned with labeled data to an initial model for which the learning is not performed yet.

However, this method may use information on the feature representation space obtained through unsupervised learning only for initializing model parameters without fully utilizing the information.

SUMMARY

The present disclosure relates to an automatic labeling method for unlabeled point clouds among a set of point clouds. A point cloud, here, is referred to as a set of 2D or 3D points which are obtained, for example, by light detection and ranging (lidar).

An embodiment of the present disclosure provides a method of automatically labeling a massive quantity of unlabeled data (i.e., unlabeled point clouds).

According to an example embodiment of the present disclosure, the method may construct learning data that is used to train a deep learning model for detecting objects around a vehicle in a time-effective and cost-effective way.

However, technical features of embodiments of the present disclosure are not limited to the foregoing features, and other technical features may also be present. Additional features of the disclosure will be set forth in part in the description which follows and, in part, will be apparent from the description, or may be learned by practice of the presented embodiments of the disclosure.

According to an example embodiment, there is provided an automatic labeling method for automatically assigning labels to unlabeled point clouds among a set of point clouds including labeled ones, the automatic labeling method including step (a) of constructing an initial machine learning classification model, step (b) of selecting at least one labeled point cloud for each of the unlabeled point clouds based on similarities between a feature vector of the unlabeled point cloud output through the model and feature vectors of the labeled point clouds output through the model, and assigning a cluster label to each of the unlabeled point clouds based on a label of the selected at least one labeled point cloud, step (c) of assigning pseudo labels to the unlabeled point clouds having the cluster labels, each pseudo label being assigned based on a confidence score which is obtained through the model, and step (d) of updating the initial model by training the mode with the labeled point clouds and the point clouds of the pseudo labels, in which the steps (b) through (d) are performed iteratively after step (d).

In at least one embodiment of the present disclosure, the step (c) may include step (e) of selecting a part of the unlabeled point clouds based on silhouette scores thereof which are obtained through the mode and step (f) of assigning the pseudo labels, each pseudo label being assigned based on a prediction result probability value obtained through the model for each point cloud of the selected part.

In at least one embodiment of the present disclosure, the pseudo label may be assigned with a temporary label or the cluster label according to whether the temporary label and the cluster label are the same, the temporary label being determined based on the prediction result probability value obtained through the model.

In at least one embodiment of the present disclosure, the unlabeled point clouds to which the pseudo labels are not assigned in the selected part may remain unlabeled.

In at least one embodiment of the present disclosure, the step (c) may further include step (g) of assigning pseudo labels to the unlabeled point clouds which are not included in the selected part, each pseudo label being assigned based on the prediction result probability value obtained through the model.

In at least one embodiment of the present disclosure, the pseudo label may be assigned to the unlabeled point cloud if the temporary label corresponds to a class that is not in the feature vectors of the point clouds of the selected part, the temporary label being determined based on the prediction result probability value obtained through the model for the corresponding unlabeled point cloud.

In at least one embodiment of the present disclosure, the unlabeled point clouds to which the pseudo labels are not assigned among the unlabeled point clouds not included in the selected part may remain unlabeled.

In at least one embodiment of the present disclosure, the step (a) may comprise after unsupervised learning that uses the unlabeled point clouds, constructing the model through supervised learning that uses the labeled point clouds.

In at least one embodiment of the present disclosure, the iterative performing may be terminated when the pseudo label is no longer assigned in the step (c).

In at least one embodiment of the present disclosure, the step (b) may comprise selecting a preset number of labeled point clouds for each of the unlabeled point clouds based on the similarities, and assigning, as the cluster label, a label with a highest frequency among labels of the selected labeled point clouds.

In at least one embodiment of the present disclosure, the preset number may be 20 or greater.

According to example embodiments described herein, massive data of point clouds that are not labeled may be automatically labeled.

According to example embodiments described herein, a result of automatic labeling may be of a high confidence and effective in terms of time and costs.

According to example embodiments described herein, learning data of a deep learning model for detecting objects around a vehicle may be constructed in a time- and cost-effective, and highly confident way.

Additional advantages, objects, and features of embodiments of the present disclosure will be set forth in part in the description which follows and in part will become apparent to those having ordinary skill in the art upon examination of the following or may be learned from practice of the disclosure. The objects and other advantages of embodiments of the disclosure may be realized and attained by the structure particularly pointed out in the written description and claims hereof as well as the appended drawings.

DETAILED DESCRIPTION OF ILLUSTRATIVE EMBODIMENTS

Hereinafter, embodiments of the present disclosure will be described in detail with reference to the accompanying drawings, and the same or similar elements will be given the same reference numerals regardless of reference symbols, and redundant description thereof will be omitted. In the following description, the terms "module" and "unit" for referring to elements are assigned and used interchangeably in consideration of convenience of explanation, and thus, the terms per se do not necessarily have different meanings or functions. Further, in describing the embodiments disclosed in the present specification, when it is determined that a detailed description of related publicly known technology may obscure the gist of the embodiments disclosed in the present specification, the detailed description thereof will be omitted. The accompanying drawings are used to help easily explain various technical features and it should be understood that the embodiments presented herein are not limited by the accompanying drawings. As such, embodiments of the present disclosure should be construed to extend to any alterations, equivalents and substitutes in addition to those which are particularly set out in the accompanying drawings.

Although terms including ordinal numbers, such as "first," "second," etc., may be used herein to describe various elements, the elements are not limited by these terms. These terms are generally only used to distinguish one element from another.

When an element is referred to as being "coupled" or "connected" to another element, the element may be directly coupled or connected to the other element. However, it should be understood that another element may be present therebetween. In contrast, when an element is referred to as being "directly coupled" or "directly connected" to another element, it should be understood that there are no other elements therebetween.

A singular expression includes the plural form unless the context clearly dictates otherwise.

In the present specification, it should be understood that a term such as "include" or "have" is intended to designate that the features, numbers, steps, operations, elements, parts, or combinations thereof described in the specification are present, and does not preclude the possibility of addition or presence of one or more other features, numbers, steps, operations, elements, parts, or combinations thereof.

In addition, the term "unit" or "control unit" included in the names of a hybrid control unit (HCU), a motor control unit (MCU), etc. is merely a widely used term for naming a controller that controls a specific vehicle function, and does not mean a generic functional unit. For example, each controller may include a communication device that communicates with another controller or a sensor to control a function assigned thereto, a memory that stores an operating system, a logic command, input/output information, etc., and one or more processors that perform a determination, calculation, decision, etc. necessary for controlling a function assigned thereto.

Figure 1:
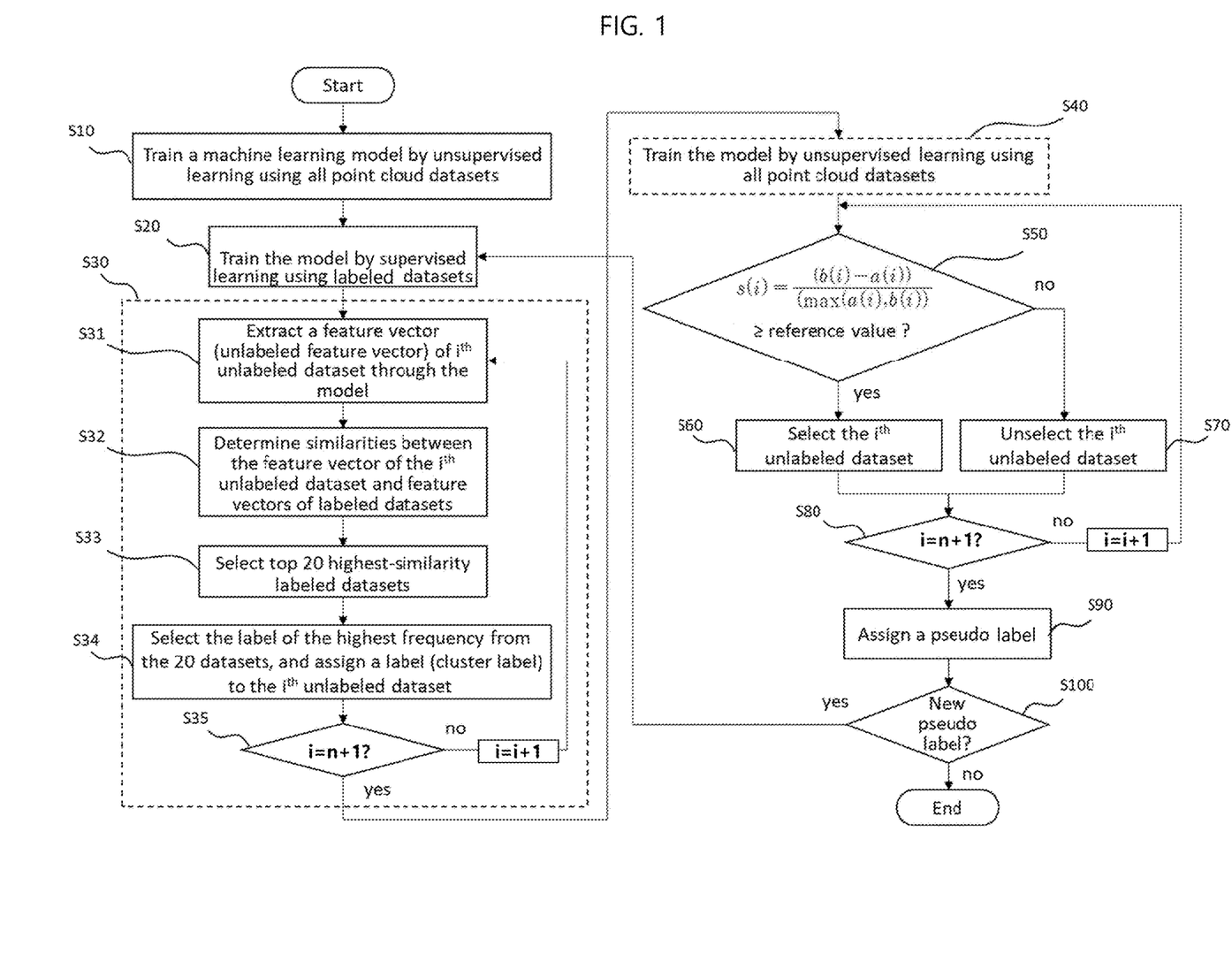
FIG. 1 is a flowchart illustrating an example of an automatic labeling method according to an embodiment of the present disclosure.
Figure 2:
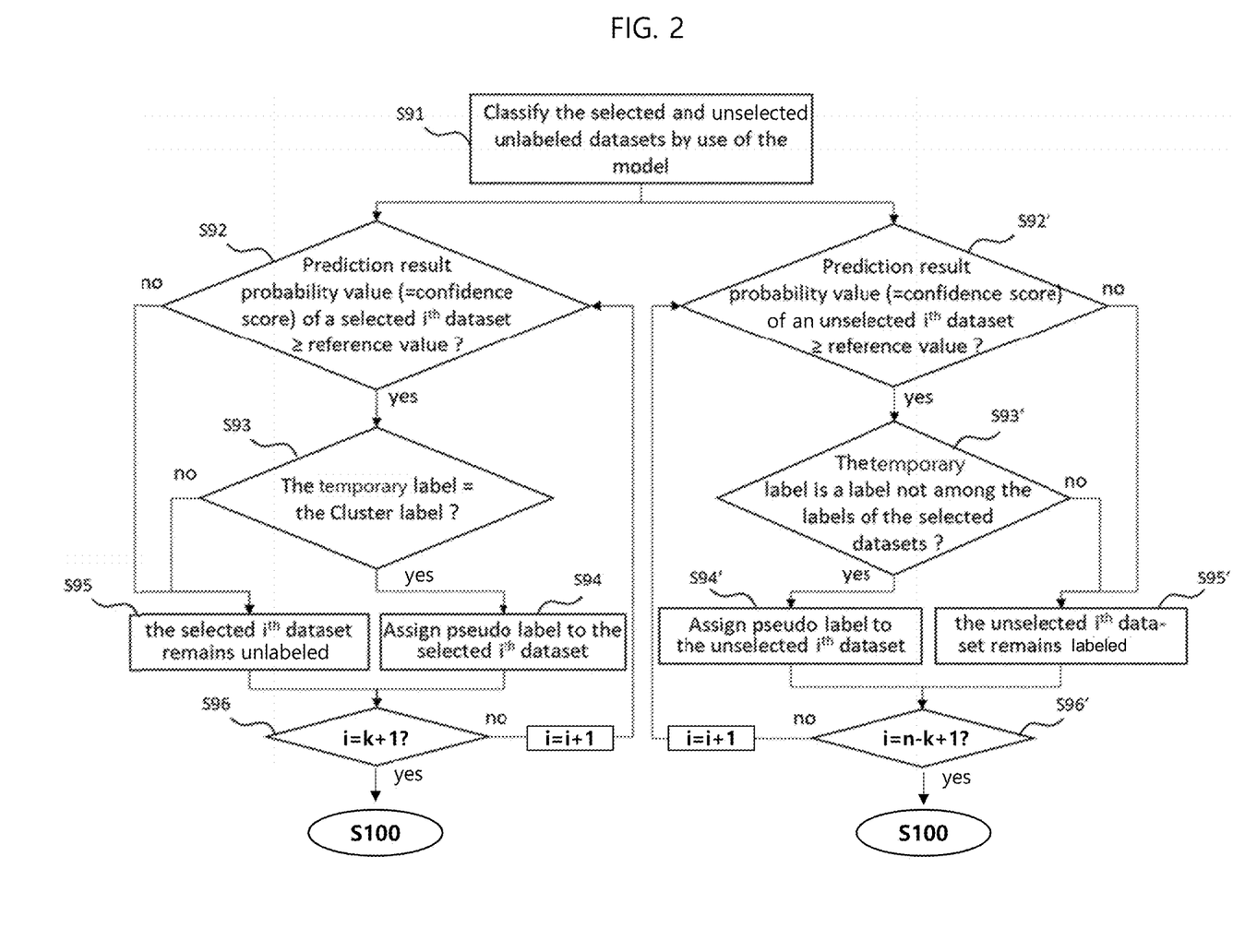
FIG. 2 is a flowchart illustrating an example of a pseudo label assigning step according to an embodiment of the present disclosure.
Figure 3:
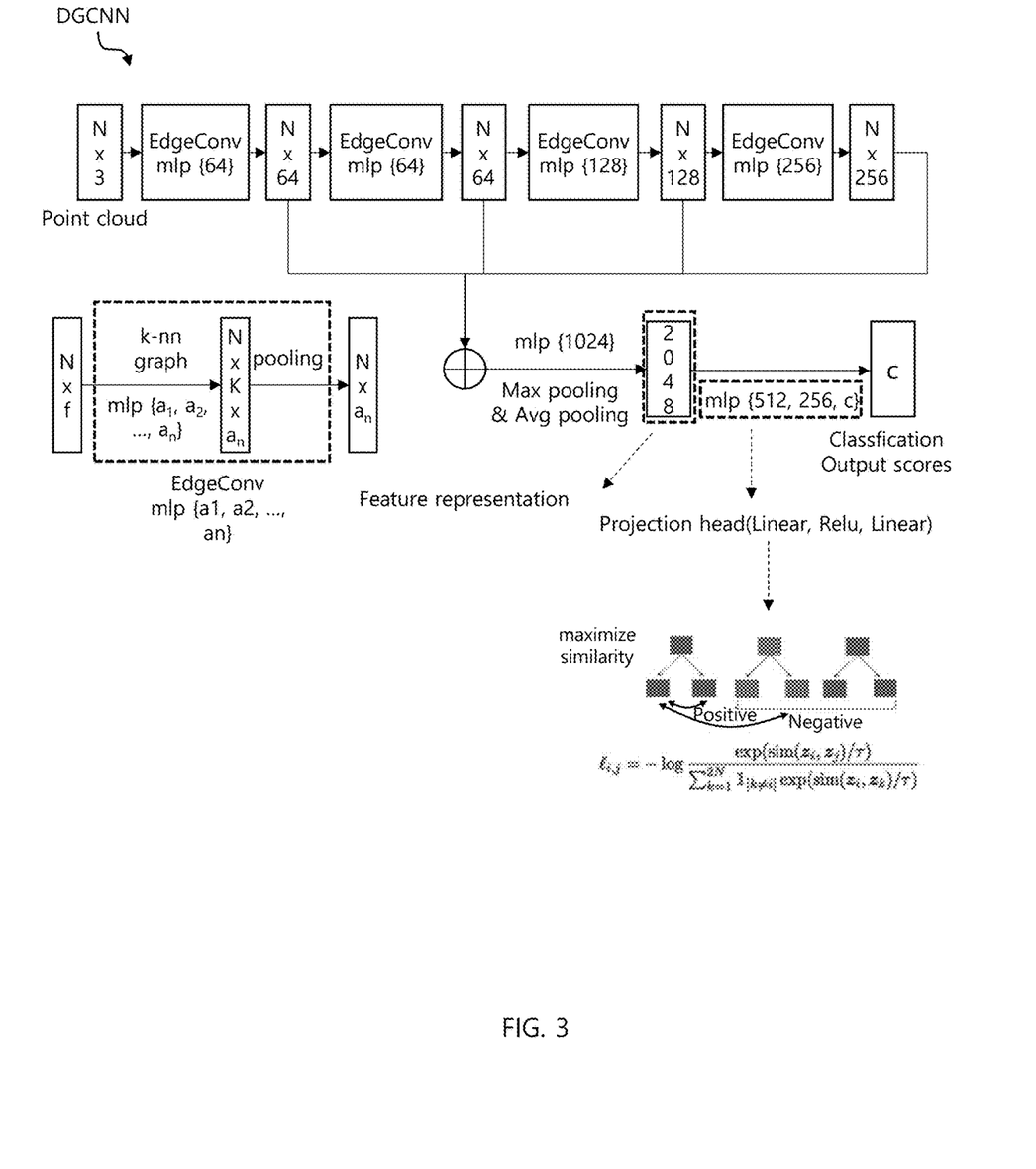
FIG. 3 illustrates an example of training by unsupervised learning for a classification model.
Figure 4:
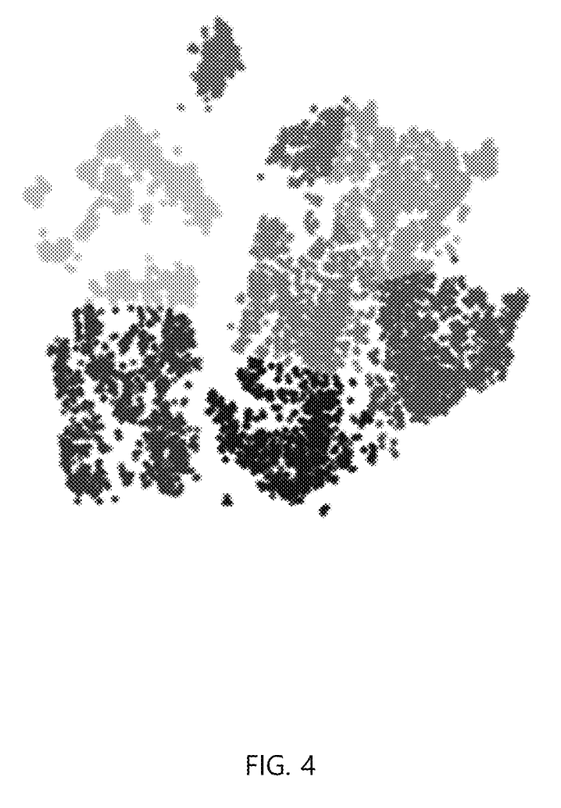
FIG. 4 illustrates a visualized example obtained by visualizing data of point clouds in a feature representation space by a classification model trained by the learning illustrated in FIG. 3.
Figure 5:
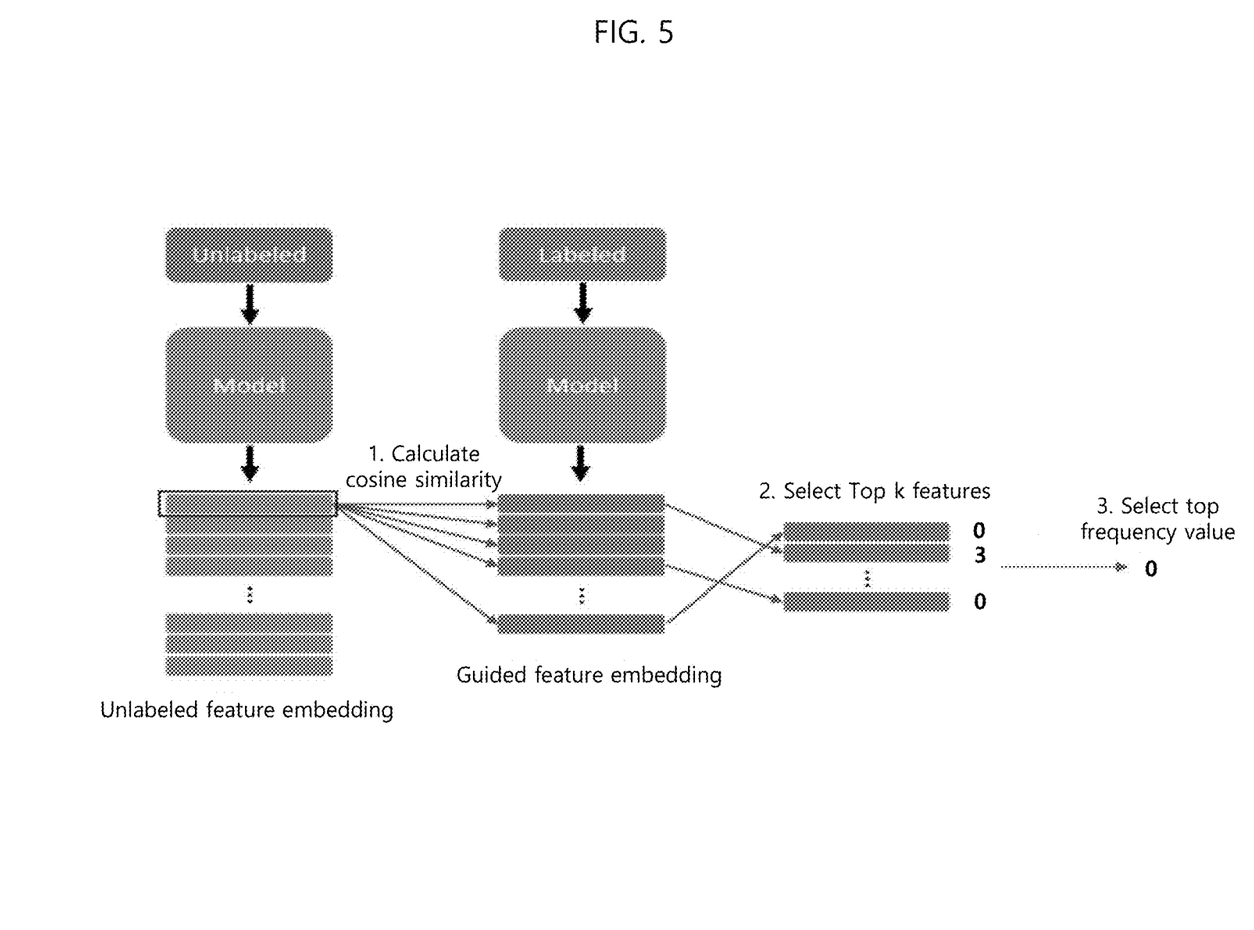
FIG. 5 illustrates an example of assigning a cluster label to an unlabeled point cloud.
Figure 6A:
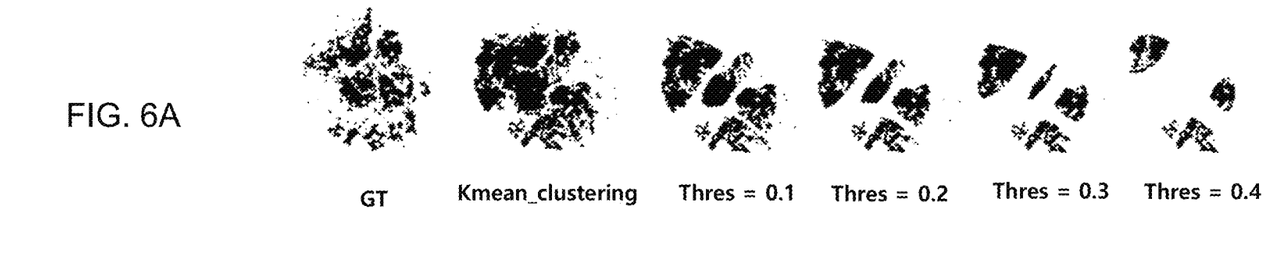
FIGS. 6A and 6B illustrate visualized examples obtained by visualizing, based on a reference value, results which are obtained by the classification model for the unlabeled point clouds and filtered based on a silhouette score.
Figure 6B:
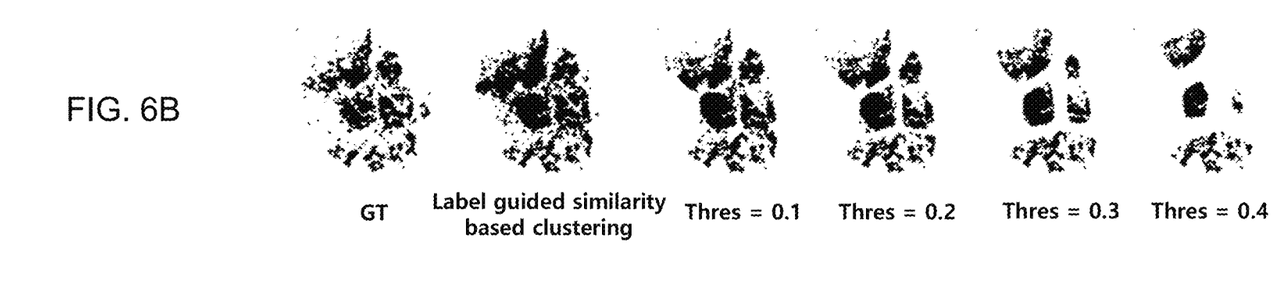

Regarding the accompanying drawings, FIG. 1 is a flowchart illustrating an example of an automatic labeling method according to an embodiment of the present disclosure, FIG. 2 is a flowchart illustrating an example of a pseudo label assigning step of FIG. 1, FIG. 3 illustrates an example of an unsupervised learning process of a classification model, FIG. 4 illustrates a visualized example obtained by visualizing data of point clouds in a feature representation space with the corresponding results by a classification model trained by the learning illustrated in FIG. 3, FIG. 5 illustrates an example of a process of assigning a cluster label to an unlabeled point cloud, and FIG. 6 illustrates a visualized example obtained by visualizing, based on a reference value, results which are obtained by the classification model for the unlabeled point clouds and filtered based on a silhouette score.

According to an example embodiment of the present disclosure, the automatic labeling method described herein may be automatically performed through a computer processing device, which may include a step of preparing a machine learning classification model, as illustrated in FIG. 1.

The machine learning classification model may refer to a computation model configured to receive point clouds as digital data, perform various computing operations thereon, and classify the point clouds based on features or classify them into preset classes, and may be desirably a neural network model, for example, a deep learning model.

According to an example embodiment of the present disclosure, the classification model may be suitable for classifying a point cloud obtained through light detection and ranging (lidar) based on an object type.

Such object classification may be implemented to be suitable to detect objects for autonomous driving, and the objects may include, for example, passenger vehicles, commercial vehicles, two-wheeled vehicles, poles (e.g., traffic lights or sign poles), guardrails, or the like.

The classification model may output a feature vector with an input of a point cloud, and each element included in the feature vector may be a probability value corresponding to a class.

For example, when there are seven preset classes and a feature vector is [80, 10, 3, 1, 2, 4, 0], it may indicate that the probability of the corresponding point cloud belonging to a first class is 80%, the probability of the point cloud belonging to a second class is 10%, and the probabilities of the point cloud belonging to third, fourth, fifth, sixth, and seventh classes are 3%, 1%, 2%, 4%, and 0%, respectively.

Programmatically, the index of an element may be used to denote each class, and, for example, the first through seventh classes may be represented as integer indices 0 to 6.

For example, respective classes of a passenger vehicle, a commercial vehicle, a two-wheeled vehicle, a pole (e.g., a traffic light or sign pole), a guardrail, and others may be represented as integer indices 0 to 6. An integer index for classification may be used as described above, but the foregoing integer indices are provided merely as an example.

According to an example embodiment, training of the classification model may include supervised learning and unsupervised learning.

First, in step S10, training by unsupervised learning may be performed using all point clouds including point clouds having label information (simply referred to as "labeled point clouds") and point clouds without label information (simply referred to as "unlabeled point clouds").

A quantity of unlabeled point clouds may be considerably greater than that of labeled ones. For example, there may be a total of 30,000 point clouds or greater, of which the labeled ones may account for merely several percentages (%) and the unlabeled ones may account for the remaining.

FIG. 3 illustrates an example of training by unsupervised learning for the classification model configured as a dynamic graph convolutional neural network (DGCNN).

As illustrated in FIG. 3, feature vectors of point clouds may be extracted using the DGCNN, and training may be performed by applying a contrastive loss function to the extracted feature vectors.

FIG. 4 illustrates a visualized example obtained by visualizing, in a feature representation space, point clouds with the corresponding results through the model trained by such unsupervised learning, and it may be verified that feature vectors with similar features cluster more favorably as illustrated in FIG. 4.

In step S20, after the training by the unsupervised learning is completed, training by supervised learning may be performed only with the labeled point clouds.

If the supervised learning is completed, the classification model may output, in the form of a feature vector, probability values that are a result of a prediction of classification in response to an input of a point cloud.

In step S30, when the classification model is ready after training by the learning, a step for preliminarily assigning a label (hereinafter a "cluster label") to the unlabeled point clouds based on a similarity to the labeled point clouds is performed.

To this end, a feature vector (hereinafter an "unlabeled feature vector") of each unlabeled point cloud may be extracted through the classification model, and its similarities to the feature vectors of the labeled point clouds are determined by comparing it to them.

For the similarity determination, cosine similarity clustering may be used.

A cosine similarity for two feature vectors A and B may be defined as represented by the following equation.

$$\text{similarity} = \cos(\theta) = \frac{A \cdot B}{\|A\|\|B\|} = \frac{\sum_{i=1}^{n} A_i \times B_i}{\sqrt{\sum_{i=1}^{n} (A_i)^2} \times \sqrt{\sum_{i=1}^{n} (B_i)^2}} \qquad \text{Equation 1}$$

A plurality of labeled point clouds may be selected based on its similarities of each unlabeled point cloud as illustrated in FIG. 5.

For example, for a single unlabeled point cloud, top 20 or more labeled point clouds may be selected based on the similarities of the unlabeled point cloud.

In addition, based on label information of the labeled point clouds selected as described above, a cluster label of the unlabeled point cloud may be determined.

For example, the cluster label may be determined by the label information of a highest frequency among the label information of the selected labeled point clouds.

FIG. 5 illustrates an example where a cluster label of a corresponding unlabeled point cloud is determined as 0 because the labels of the selected labeled point clouds are 0, 3, . . . , 0, of which the one of the highest frequency is 0. In this example, a label is the same as an object classification index number. That is, a point cloud with the label of 0 refers to a point cloud belonging to the '0' class, i.e., for example in the above described class example the 'passenger vehicle' class.

In step S40, after cluster labels are assigned to all the unlabeled point clouds, the classification model may be trained again through unsupervised learning and/or supervised learning using all the point clouds.

This step may not be necessarily performed but omitted.

The assigned cluster labels may be a mixture of ones with high and low confidence scores, and thus the ones with high confidence scores may need to be sorted out.

To this end, feature vectors may be extracted by allowing the unlabeled point clouds to pass through the classification model, and each silhouette score, which indicates how close the corresponding point cloud is to the other point clouds of the same cluster label and how distant it is from the point clouds of other cluster labels, may be calculated as represented by the following equation.

$$s(i) = \frac{(b(i) - a(i))}{(\max(a(i), b(i))}$$ Equation 2

In Equation 2, $a(i)$ indicates a mean value of the distances of the $i^{th}$ point cloud to the other point clouds of the same cluster label, and $b(i)$ indicates a mean value of the distances of the $i^{th}$ point cloud to the point clouds of the cluster label whose point cloud cluster is closest to the $i^{th}$ point cloud.

In step S50, unlabeled point clouds with the calculated silhouette score that is greater than or equal to a reference value may be selected. In steps S60 and S70, the selected unlabeled point clouds (hereinafter "selected point clouds") and unselected unlabeled point clouds (hereinafter "unselected point clouds") may be classified.

FIGS. 6A and 6B illustrate visualized examples of unlabeled point clouds selected based on a reference value, in which FIG. 6A uses a conventional method (e.g., a k-means clustering algorithm) and FIG. 6B uses the present embodied method.

As shown in FIGS. 6A and 6B, the case according to the present example embodiment exhibited a more desirable clustering effect than the case using the conventional k-means clustering algorithm.

In step S90, a pseudo label may be assigned to each of the unlabeled point clouds.

FIG. 2 is a flowchart illustrating a pseudo label assigning step according to an example embodiment of the present disclosure. The pseudo label assigning step will be described hereinafter with reference to the flowchart.

First, in step S91, a classification task may be performed by inputting all the selected and unselected point clouds obtained in the preceding step to the classification model.

In step S92, whether the prediction result probability value (or a confidence score) of each selected point cloud is greater than or equal to a reference value may be determined. In step S93, if it is greater than or equal to the reference value, whether the label determined through the classification model (hereinafter a label determined through the classification model for a point cloud is referred to as a "temporary label" therefor) is the same as the cluster label may be determined.

In step S94, if the temporary label is the same as the cluster label, the label may be assigned as a pseudo label to the corresponding point cloud.

In step S95, if either the prediction result probability value is less than the reference value or the temporary label is not the same as the cluster label, the point cloud may remain unlabeled.

Steps S92, S93, S94 and S95 are performed for all the selected k datasets by being iterated until i reaches 'k+1' in step S96.

For each of the unselected point clouds, in step S92', whether a prediction result probability value is greater than or equal to the reference value may be determined in a similar way as described above. In step S93', if it is greater than or equal to the reference value, whether the temporary label is a label not among the labels of the selected point clouds may be determined. In step S94', only if it is the case, the temporary label may be assigned as a pseudo label to the corresponding unselected point cloud.

In step S95', if either the prediction result probability value is less than the reference value or the temporary label is the same as any one of the labels of the selected point clouds, the unselected point cloud may remain unlabeled.

Steps S92', S93', S94' and S95' are performed for all the unselected n-k datasets by being iterated until i reaches 'n-k+1' in step S96'.

In step S20, if pseudo labels are assigned to at least a portion of the unlabeled point clouds, the labeled data may be augmented, and the classification model may be trained using the augmented data.

After the classification model is trained using the augmented data, the steps described above with reference to FIG. 1 may be performed iteratively.

The steps may be iteratively performed until a new pseudo label is no longer assigned (no in S100).

What is claimed is:

1. An automatic labeling method for automatically assigning labels to unlabeled point clouds among a set of labeled and unlabeled point clouds, the automatic labeling method comprising:
   (a) preparing an initial machine learning classification model;
   (b) selecting a labeled point cloud for each of the unlabeled point clouds based on similarities between a feature vector of each of the unlabeled point clouds output through the model and feature vectors of the labeled point clouds output through the model and assigning a cluster label to each of the unlabeled point clouds based on a label of the selected labeled point cloud;
   (c) assigning pseudo labels to the unlabeled point clouds to which the cluster labels are assigned, wherein each pseudo label is assigned based on a confidence score obtained through the model; and
   (d) updating the model by training the model with the labeled point clouds and the unlabeled point clouds to which the pseudo labels are assigned, wherein, steps (b) through (d) are performed iteratively after step (d).

2. The automatic labeling method of claim 1, wherein step (c) comprises:
   selecting a part of the unlabeled point clouds based on silhouette scores thereof obtained through the model; and assigning the pseudo labels, wherein each pseudo label is assigned based on a prediction result probability value obtained through the model for each point cloud of the selected part.

3. The automatic labeling method of claim 2, wherein each pseudo label is assigned with a temporary label or the cluster label according to whether the temporary label and the cluster label are the same, and wherein the temporary label is determined based on the prediction result probability value obtained through the model.

4. The automatic labeling method of claim 3, wherein the unlabeled point clouds to which pseudo labels are not assigned in the selected part remain unlabeled.

5. The automatic labeling method of claim 2, wherein step (c) further comprises assigning pseudo labels to the unlabeled point clouds that are not included in the selected part, wherein each pseudo label is assigned based on the prediction result probability value obtained through the model.

6. The automatic labeling method of claim 5, wherein each pseudo label is assigned to the unlabeled point cloud if a temporary label corresponds to a class that is not in the feature vectors of the unlabeled point clouds of the selected part, and wherein the temporary label is determined based on the prediction result probability value obtained through the model for the corresponding unlabeled point cloud.

7. The automatic labeling method of claim 6, wherein the unlabeled point clouds to which pseudo labels are not assigned among the unlabeled point clouds not included in the selected part remain unlabeled.

8. The automatic labeling method of claim 1, wherein step (a) comprises, after unsupervised learning that uses the unlabeled point clouds, constructing the model through supervised learning that uses the labeled point clouds.

9. The automatic labeling method of claim 1, wherein the iterative performing is terminated when the pseudo labels are no longer assigned in step (c).

10. The automatic labeling method of claim 1, wherein step (b) comprises:
    selecting a preset number of labeled point clouds for each of the unlabeled point clouds based on the similarities; and
    assigning, as the cluster label, a label with a highest frequency among labels of the selected labeled point clouds.

11. The automatic labeling method of claim 10, wherein the preset number is 20 or greater.

12. An automatic labeling method for automatically assigning labels to unlabeled point clouds among a set of labeled and unlabeled point clouds, the automatic labeling method comprising:
    preparing an initial machine learning classification model by unsupervised learning followed by supervised learning;
    selecting a labeled point cloud for each of the unlabeled point clouds based on similarities between a feature vector of each of the unlabeled point clouds output through the model and feature vectors of the labeled point clouds output through the model and assigning a cluster label to each of the unlabeled point clouds based on a label of the selected labeled point cloud;
    assigning pseudo labels to the unlabeled point clouds to which the cluster labels are assigned, wherein each pseudo label is assigned based on a confidence score obtained through the model;
    updating the model by training the model with the labeled point clouds and the unlabeled point clouds to which the pseudo labels are assigned; and
    performing selecting the labeled point cloud, assigning the pseudo labels, and updating the model by training iteratively after initially updating the model by training.

13. The automatic labeling method of claim 12, wherein assigning the pseudo labels comprises:
    selecting a part of the unlabeled point clouds based on silhouette scores thereof obtained through the model; and
    assigning the pseudo labels, wherein each pseudo label is assigned based on a prediction result probability value obtained through the model for each point cloud of the selected part.

14. The automatic labeling method of claim 13, wherein each pseudo label is assigned with a temporary label or the cluster label according to whether the temporary label and the cluster label are the same, and wherein the temporary label is determined based on the prediction result probability value obtained through the model.

15. The automatic labeling method of claim 14, wherein the unlabeled point clouds to which pseudo labels are not assigned in the selected part remain unlabeled.

16. The automatic labeling method of claim 13, wherein assigning the pseudo labels further comprises assigning the pseudo labels to the unlabeled point clouds that are not included in the selected part, wherein each pseudo label is assigned based on the prediction result probability value obtained through the model.

17. The automatic labeling method of claim 16, wherein each pseudo label is assigned to the unlabeled point cloud if a temporary label corresponds to a class that is not in the feature vectors of the unlabeled point clouds of the selected part, and wherein the temporary label is determined based on the prediction result probability value obtained through the model for the corresponding unlabeled point cloud.

18. The automatic labeling method of claim 17, wherein the unlabeled point clouds to which pseudo labels are not assigned among the unlabeled point clouds not included in the selected part remain unlabeled.

19. The automatic labeling method of claim 12, further comprising terminating performing selecting the labeled point cloud, assigning the pseudo labels, and updating the model by training iteratively in response to the pseudo labels no longer being assigned.

20. The automatic labeling method of claim 12, wherein selecting the labeled point cloud comprises:
    selecting a preset number of labeled point clouds for each of the unlabeled point clouds based on the similarities; and
    assigning, as the cluster label, a label with a highest frequency among labels of the selected labeled point clouds.

* * * * *